United States Patent [19]

Röck et al.

[11] Patent Number: 4,697,946
[45] Date of Patent: Oct. 6, 1987

[54] FURNITURE CONNECTOR

[75] Inventors: Erich Röck, Höchst; Helmut Hollenstein, Lustenau, both of Austria

[73] Assignee: Julius Blum Gesellschaft m.b.H., Höchst, Austria

[21] Appl. No.: 846,816

[22] Filed: Apr. 1, 1986

[30] Foreign Application Priority Data

Apr. 25, 1985 [AT] Austria ................... 1237/85

[51] Int. Cl.⁴ .......................... F16B 7/08; F16B 21/00
[52] U.S. Cl. .......................................... 403/9; 403/230; 403/327; 403/407.1
[58] Field of Search .......................... 403/407.1, 405.1, 9, 403/241, 261, 322, 321, 325, 231, 230, 243, 330, 327

[56] References Cited

U.S. PATENT DOCUMENTS

| | | | |
|---|---|---|---|
| 2,688,173 | 9/1954 | Van Peet | 403/327 X |
| 3,179,450 | 4/1965 | Recker | 403/325 |
| 3,356,325 | 12/1967 | Schnase | 403/322 |
| 3,596,942 | 8/1971 | Zoebelein | 403/230 |
| 3,836,267 | 9/1974 | Schatz | 403/231 |
| 4,360,282 | 11/1982 | Koch | 403/231 |
| 4,553,888 | 11/1985 | Crissy et al. | 403/327 X |
| 4,564,306 | 1/1986 | Röck et al. | 403/231 |

FOREIGN PATENT DOCUMENTS 141702  5/1980  German Democratic Rep. ................... 403/327

Primary Examiner—Cornelius J. Husar
Assistant Examiner—Peter M. Cuomo
Attorney, Agent, or Firm—Wenderoth, Lind & Ponack

[57] ABSTRACT

Furniture connectors are provided to connect the front plate of a drawer with the drawer side walls and rail members. A slide member which holds a holding bolt is provided in each furniture connector. A spring engages the slide member to pivot the slide member about an axle eccentrically arranged in a housing of the furniture connector and in a radial plane of the housing which is designed like a dowel casing.

6 Claims, 6 Drawing Figures

FURNITURE CONNECTOR

FIELD AND BACKGROUND OF THE INVENTION

The invention relates to a furniture connector, in particular for connecting a drawer front plate with a drawer side wall and/or a rail member of a drawer, comprising a housing which is designed like a dowel casing and insertable into a furniture part, for example the front plate of the drawer, with a holding means for an inwardly projecting holding bolt of the second furniture part, for example the side wall or the rail member of the drawer, being arranged in said housing. The holding means is formed by a slide member acted upon by a spring, preferably a pressure spring, and movable in a plane extending vertically to the push-in direction of the housing.

In modern furniture construction, drawers are widely known in which the front plate can be adjustably fastened to the drawer side walls, i.e. to the side walls of the piece of furniture, by means of suitable holding means. An example thereof is described in European Patent Specification No. 0058220.

In some cases, a rail member is provided above each side wall of the drawer extending from the front plate to a rear wall of the drawer or to a supporting member fastened to the rear wall of the drawer.

A prior application by the same applicant suggests the use of the rail member for the adjustment of the inclination of the front plate.

SUMMARY OF THE INVENTION

It is the object of the invention to provide a furniture connector which is particularly suitable for connecting a front plate to the side walls of the drawer and which, hence, permits very quick mounting of the front plate of the drawer and at the same time an alignment of the position, i.e. an adjustment of the mounted drawer front plate.

According to the invention, this is achieved in that the slide member is pivotable about an axle eccentrically arranged in the housing and moves in a radial plane of the housing designed in the form of a dowel casing.

The plane of engagement of the slide member in a notch of a corresponding fitting part is exactly defined and does not depend on how far the slide member is pressed by the spring in the engaging direction.

The fitting according to the invention is particularly suitable for drawers having rail members. In a drawer of this kind, a furniture connector according to European Patent Application No. 0058220 could not be used because the furniture part cannot be anchored anywhere.

It is preferable that the housing is provided with a cover plate which has a central opening through which the holding bolt or fitting part can be inserted.

A further embodiment of the invention provides that the cover plate has an eccentric, preferably circularly arced, opening which permits insertion of a tool, for example a screw driver, into the housing to engage the slide member.

A further embodiment of the invention provides that the rail member does not have a circularly arced but an angular cross-section. The rail member has, for example, a square cross-section. In this embodiment, it is of advantage if a locking means is provided which prevents unintentional turning of the furniture part. Such locking means may be arranged directly at the housing of the furniture connector but it may also be a part of a separate structural member of the drawer fitting.

The rail member is held at the drawer front plate by means of the furniture connector according to the invention. At the other end, the rail member has a threaded pin which engages in a female thread at the rear wall of the drawer. Thus, by turning the rail member, the drawer front plate can be pivoted about a pivot axle positioned at a bearing point of the drawer front plate at the drawer side walls.

BRIEF DESCRIPTION OF THE DRAWINGS

In the following an embodiment of the invention will be described in more detail with reference to the accompanying drawings, in which.

DESCRIPTION OF THE PREFERRED EMBODIMENT

Figure 1:
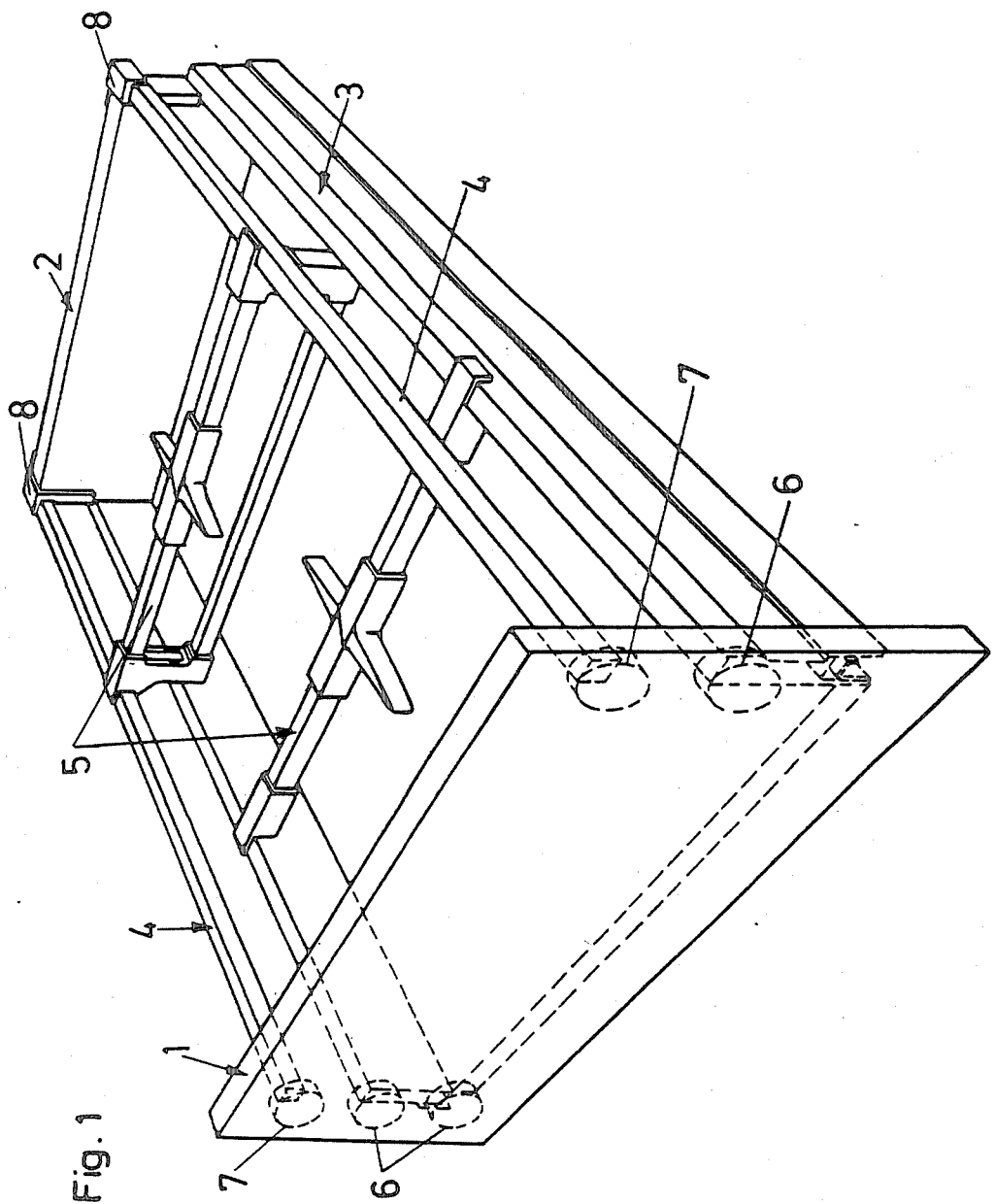
FIG. 1 is a schematic perspective view of a drawer provided with a furniture connector according to the invention.

As can be seen from FIG. 1, a drawer includes a front plate 1, a rear wall 2, side walls 3 and rail members 4.

Separating members 5 are also provided in the drawer but they will not be further described.

The drawer side walls 3 are preferably made of metal and coated with plastics material but they can equally be injection-moulded or extruded parts of plastics material.

The drawer side walls may be of wood, which is rarely the case however. The front plate 1 is preferably made of wood material, for example of chip board.

As can be seen from FIG. 1, the front plate 1 is connected with the drawer side walls 3 by means of furniture connectors 6, and with each rail member 4, by means of a respective furniture connector 7.

Figure 2:
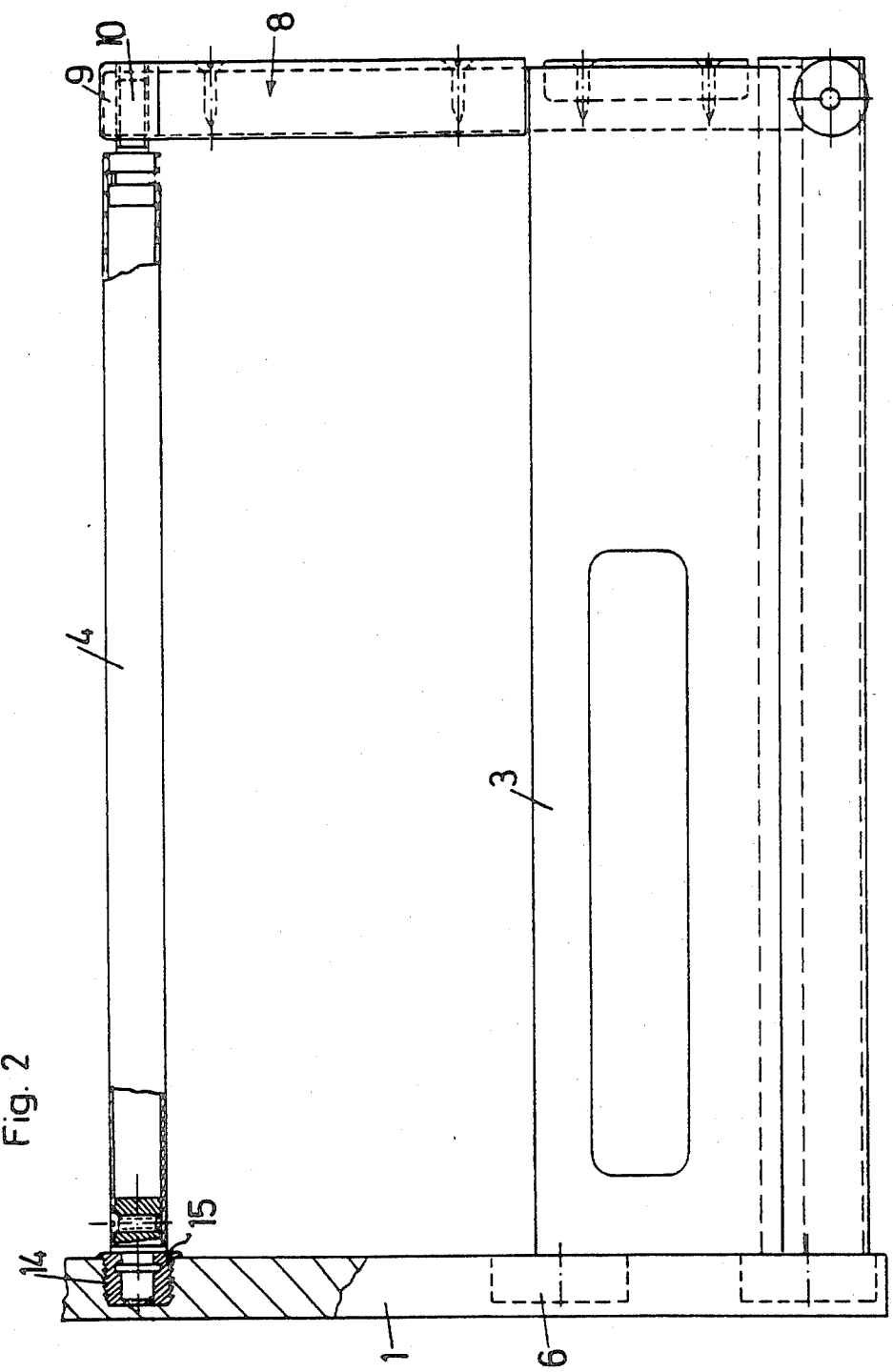
FIG. 2 is a side view of the drawer, parts thereof being shown in section.

At the rear end, each rail member 4 is mounted in a supporting member 8 which is fastened to the rear wall 2 of the piece of furniture. Each supporting member 8 has a female thread 9 into which a threaded pin 10 of the rail member 4 projects (FIG. 2). By turning the rail member 4, the latter-mentioned can be screwed into the supporting member 8 to the required extent. The rail members 4, are freely turnable in the respective furniture connector 7. Thus, the inclination of the front plate 1 can be adjusted. To avoid unintentional turning of the rail member 4, each supporting member 8 has engaging means 11 in the form of a circularly-arced part 12 with two cams 13. One edge of the respective rail member 4, which has a rectangular cross-section, engages between the cams 13.

Now, the furniture connectors 7 which connect the front plate 1 with rail members 4 will be described.

Each furniture connector 7 has a cylindrical housing 14 which is designed like a dowel casing and insertable into a corresponding bore 15 in the drawer front plate 1. The housing 14 is preferably made of injection-moulded plastics material.

A slide member 16 is arranged in the housing 14. The slide member 16 is mounted on an axle 17 which is arranged near the wall of the housing. A spring 18, which is a compression coil spring in the illustrated embodiment, presses against the slide member 16 to pivot slide member 16 about the axle 17.

Figure 3:
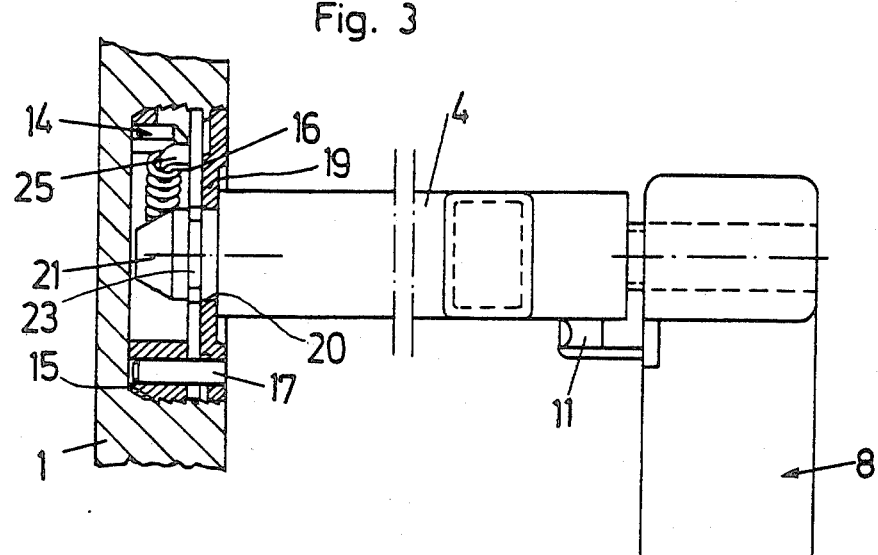
FIG. 3 is a vertical sectional view of a furniture connector according to the invention and the connection between the drawer front plate and the rail member as well as the connection between the rail member and a supporting member associated with the rear wall of the drawer.
Figure 4:
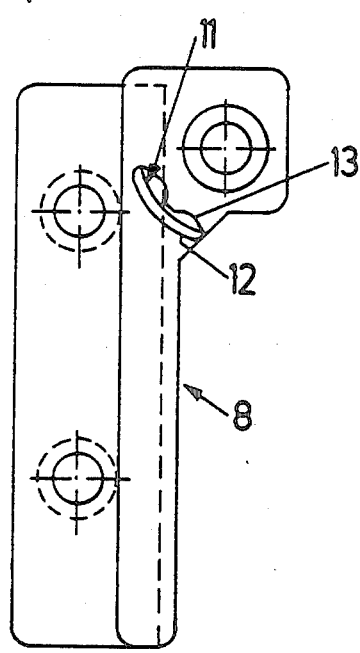
FIG. 4 is a front view of the supporting member associated with the rear wall of the drawer.

The housing 14 further has a cover 19 which has a central coaxial opening 20 through which a holding bolt 21 is insertable (FIG. 3).

In a locked position, a portion 22 of the slide 16 projects into the region of the central opening 20. The bolt 21 has an annular groove 23. When the bolt 21 is inserted through the opening 20 into the housing 14, the portion 22 of slide member 16 is positioned in the annular groove 23. Thus, the bolt 21 and therefore also the rail member 4 are held in the housing 14.

The cover plate 19 has at the edge of the housing 14 an arc-shaped slot-like opening 24. A screw driver can be inserted through opening 24, and by means of the screw driver, the slide member 16 can be pivoted against the force of spring 18 about the axle 17, i.e. fully pushed out of the opening 20. The holding bolt 21 is thus released.

As can be seen in FIG. 3, the bolt 21 has a conical tip to facilitate insertion of the bolt 21 into opening 20 of the housing 14. The slide member 16 is automatically displaced by the conical tip of the bolt 21 and then engages under the pressure of the spring 18 automatically into the annular groove 23.

Figure 5:
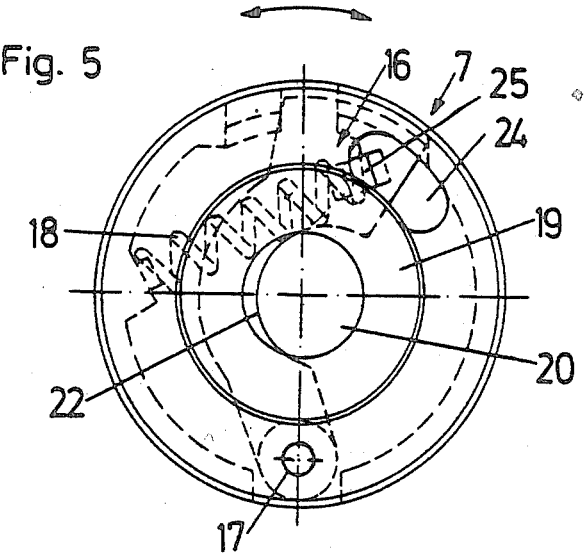
FIGS. 5 and 6 are top views of a furniture connector according to the invention, a slide member of the furniture connector being shown in the locked position in FIG. 5 and in the released position in FIG. 6.
Figure 6:
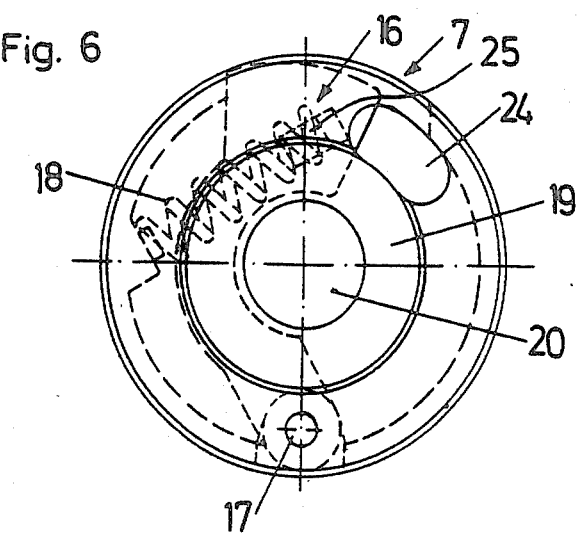

As can be seen from FIGS. 5 and 6, the spring 18 abuts on the wall of the housing 14 and is further held at a hook-shaped part 25 of the slide member 16.

The furniture connectors 6, which serve for fastening the drawer front plate 1 to the drawer side walls 3, may be designed in an analogous manner or according to the state of the art.

What is claimed is:

1. A furniture connector for joining a first furniture part, for example a drawer front plate, to a second furniture part, for example a drawer side wall or rail member, said connector comprising:

a cylindrical housing to be inserted into a bore formed in the first furniture part, said housing having a outer plate with an opening, said opening positioned coaxially centrally of said housing;

a elongated member to be fastened to the second furniture part to extend therefrom, said elongated member having an end portion which is insertable into said opening in a direction axially of said housing, and said elongated member having an annular groove formed on said end portion; and means mounted within said housing for releasably retaining said end portion of said elongated member within said housing and thereby for releasably connecting the first and second furniture parts, said retaining means comprising an axle mounted eccentrically within said housing, a slide member having first and second ends, said slide member mounted for pivotal movement about said first end on said axle in a plane transverse to the axis of said housing between a first position, whereat a portion of said slide member extends into said groove in said elongated member and thereby retains said elongated member within said housing, and a second position, whereat said portion of said slide member is withdrawn from said groove such that said elongated member may be withdrawn from said opening, and compression spring means acting between said housing and said second end of said slide member for urging said slide member to said first position thereof.

2. A connector as claimed in claim 1, wherein said axle is mounted in a wall of said housing.

3. A connector as claimed in claim 1, wherein said cover plate has formed therein an eccentrically located circularly arced opening for enabling the insertion therethrough of a tool for moving said slide member from said first position to said second position, to thereby release said elongated member.

4. A connector as claimed in claim 1, wherein said elongated member has a tapered tip end to facilitate insertion of said elongated member.

5. A connector as claimed in claim 1, wherein said elongated member is rotatable with respect to said housing about the axis of said holding bolt.

6. A connector as claimed in claim 5, further comprising engaging means for preventing unintentional rotation of the second furniture part and thereby said elongated member relative to said housing.

* * * * *